United States Patent [19]
Hotchen

[11] 4,134,459
[45] Jan. 16, 1979

[54] ROTARY CUTTING EQUIPMENT

[76] Inventor: L. Blair Hotchen, 149 W. 20th St., North Vancouver, B. C., Canada

[21] Appl. No.: 721,254

[22] Filed: Sep. 8, 1976

Related U.S. Application Data

[63] Continuation-in-part of Ser. No. 605,953, Aug. 19, 1975, abandoned.

[51] Int. Cl.$^2$ .............................................. E21C 9/00
[52] U.S. Cl. ....................................... 173/32; 125/14; 299/39
[58] Field of Search ...................... 173/31, 32; 299/39; 125/14; 83/488, 489; 248/2, 316 R, 316 B

[56] References Cited

U.S. PATENT DOCUMENTS

| | | | |
|---|---|---|---|
| 760,598 | 5/1904 | Wynegar | 248/316 R |
| 1,838,459 | 12/1931 | Smith et al. | 173/31 |
| 2,502,043 | 3/1950 | Howard | 299/39 |
| 3,485,306 | 12/1969 | Gulley | 173/32 |
| 3,722,497 | 3/1973 | Hiestand et al. | 125/14 |
| 3,763,845 | 10/1973 | Hiestand et al. | 125/14 |

Primary Examiner—Robert A. Hafer
Attorney, Agent, or Firm—Larson, Taylor and Hinds

[57] ABSTRACT

Apparatus for movably mounting and guiding rotary cutting equipment comprise an elongate track support having a circular cross-section, at least two distinct, mutually spaced elongate tracks extending along the track support and projecting from the track support beyond the periphery of the circular cross-section, a carriage for mounting rotary cutting equipment movable on the tracks along the elongate track support and equipment on the carriage and on the track support beyond the periphery of the circular cross-section for propelling, and for selectively arresting, the carriage relative to the tracks.

34 Claims, 13 Drawing Figures

ROTARY CUTTING EQUIPMENT

CROSS-REFERENCE

This is a continuation-in-part of Patent application Ser. No. 605,953, for ROTARY CUTTING EQUIPMENT, filed Aug. 19, 1975, by the subject inventor (and now abandoned), and herewith incorporated by reference herein.

BACKGROUND OF THE INVENTION

1. Field of the Invention

The subject invention relates to rotary cutting equipment and, more specifically, to apparatus for movably mounting and guiding rotary cutting equipment. A field of utility of the invention comprises concrete cutting saws.

The invention relates also to mounting devices for elongate toothed structures. A field of utility of the latter aspect of the invention comprises the mounting of toothed rack structures of concrete cutting saws.

2. Description of the Prior Art

Machines for cutting concrete and similar materials typically include a structure for movably mounting a rotary cutter or saw and for guiding that cutter along a linear path for a corresponding linear cut in the concrete or other material.

As may, for instance, be seen from U.S. Pat. No. 2,689,718, early sawing apparatus of this type employed a guide patterned after the drill stand principle. As may be seen from this reference and also from U.S. Pat. No. 2,502,043, proposals of this type used a cylindrical post or a corresponding tube as the track itself, and the surface of such post or tube as a bearing surface for a sliding part of a carriage on which the cutting tools were mounted. In practice, the high friction resulting from such design impeded the operation of the machine, particularly when the bearing surfaces became covered with concrete dust, fragments of the cutting material and other contaminants. The disclosure of U.S. Pat. No. 1,838,459 further illustrates the traditional nature of this kind of construction which is also exemplified in U.S. Pat. Nos. 2,079,864, 2,421,970 and 3,148,001. Reference may also be had to U.S. Pat. No. 2,895,281.

Similar considerations apply to the proposal apparent from U.S. Pat. No. 3,378,307, where a guide rail has a rectangular cross-section and a truck surrounds this rail and has mating surfaces engaging all sides of this rail. That proposal also suggests a cutting of rack teeth into the rail for a propulsion of the truck therealong. In practice, the multitude of notches thus cut into the rail impairs the mechanical strength and integrity thereof and renders the rail subject to relatively rapid wear.

Another proposal, apparent from U.S. Pat. No. 2,525,712, which employed a rectangular or optionally polygonal rail again employed the rail as the track itself. Also, that proposal lacked equipment for selectively propelling and arresting a movable carriage relative to the rail.

The proposal apparent from U.S. Pat. No. 3,731,821 carried the above mentioned principle somewhat further by laterally flattening a tubular guide rail in several places so as to provide planar track surfaces for carriage rollers. This procedure severely reduces the mechanical strength of the guide rail structure.

A different proposal, apparent from U.S. Pat. No. 3,323,507 employs tracks resembling somewhat those of a cog wheel railroad, which are attached to the concrete wall to be cut. In practice, this approach becomes unworkable when the concrete wall has discontinuities or is uneven.

The flat track concept of the latter type has been further developed in U.S. Pat. No. 3,485,306 and in its improvement U.S. Pat. No. 3,756,670. Both of these prior-art proposals show a track construction wherein the body of the track is an elongate, essentially flat piece of metal which carries a central rack and marginal rail portions. This practically flat track construction was considered essential in terms of facile and faultless track interconnectability in extension of the familiar monorail railroad or railway track principle. In an attempt to remedy the deficiencies of earlier versions, both proposals disclosed the use of specially designed track mounting structures comprising track mounting blocks, cross-arms for carrying the mounting blocks, and pillar-like supports for carrying the cross-arms in a bridge-like construction.

Because of the flat configuration of the track body, a relatively large number of such bridge-like supports was required and, even then, could not entirely have overcome the natural tendency of the track to flex or vibrate perpendicularly to the track plane under vibratory loads. Yet, the flat track construction was apparently preferred because it lent itself to the construction of curved tracks. The price paid for this facility was a practical limitation of the utility of such prior-art constructions to non-vibratory loads. This effectively excluded the construction under consideration from the concrete cutting or similar rotary cutting equipment field.

Recent proposals, apparent from U.S. Pat. Nos. 3,722,497 and 3,763,845, again employ rectangular guide rails which at the same time provide track surfaces for carriage rollers.

Another prior-art problem concerns the mounting of toothed guide rails or supporting structures to walls, floors and other building components. Typically, mounting brackets, bushings, stanchions and similar devices were used for this purpose. The construction of these devices was typically such that their relationship to the guide rail or toothed structure was relatively fixed. This limited the versatility of the cutting equipment in terms of the length of the guide rail or toothed structure. In particular, it frequently occurred in practice that the fixed positions of the mounting devices would render a desired cutting operation impossible where apertures or other discontinuities in the structure to be cut rendered a proper mounting of the equipment impossible. Guiding rails and toothed structures in such prior-art equipment were also weakened by apertures frequently provided for attaching mounting devices to the rails or to toothed structures. Also, toothed portions of guide rails frequently had to be recessed or cut back to provide for an accommodation of mounting devices.

U.S. Pat. No. 3,763,845 attempts to alleviate these disadvantages by use of mounting members which are capable of sliding along the rail structure. However, that disclosed construction has the disadvantage of requiring pairs of rectangular guide rails extending in parallel to each other.

A fairly recent proposal (U.S. Pat. No. 3,897,982) shows mounting members which require a slotted design of the carriage in order to avoid collision with these mounting posts. Significantly, and in accordance with the above mentioned prior-art practice, the latter carriage contacts and extends peripherally over the free surface of the track shaft, even though the above mentioned particular construction of the mounting members in effect require the provision of longitudinal ribs on the track shaft.

SUMMARY OF THE INVENTION

It is an object of the invention to overcome the above mentioned disadvantages.

It is a related object of the invention to provide improved apparatus for movably mounting and guiding rotary cutting equipment.

It is a further object of the invention to provide an improved mounting device for an elongate toothed structure.

It is also an object of this invention to provide improved rotary cutting equipment and, in particular, improved concrete cutting saws.

Other objects of the invention will become apparent in the further course of this disclosure.

The invention resides in apparatus for movably mounting and guiding rotary cutting equipment, comprising in combination an elongate track support having a circular cross-section, at least two distinct, mutually spaced elongate tracks extending along the track support and projecting from the track support beyond the periphery of the circular cross-section, means for mounting rotary cutting equipment including a carriage movable on the tracks along the elongate track support, and means on the carriage and on the track support beyond the periphery of the circular cross-section for propelling, and for selectively arresting, the carriage relative to the tracks.

From another aspect thereof, the invention resides in a mounting device for an elongate toothed structure, comprising in combination a first mounting device part, a second mounting device part, and means connected to the first and second mounting device parts for releasably retaining the first and second mounting device parts in an assembled condition, and for selectively releasing the first and second mounting device parts to a toothed structure receiving open condition. According to this aspect of the invention, the first and second mounting device parts are complementary and define an opening for receiving a portion of the toothed structure, and at least one of the first and second mounting device parts have a toothed portion at the opening for meshing with the toothed structure portion when the mentioned portion is in that opening.

From yet another aspect thereof, the invention resides in apparatus for movably mounting and guiding rotary cutting equipment, comprising in combination an elongate track support having a circular cross-section, at least two distinct, mutually spaced elongate tracks extending along the track support and projecting from the track support beyond the periphery of the circular cross-section, at least one of said tracks having a pair of track surfaces inclined relative to, and located on opposite sides of, a radial plan through the track support having the circular cross-section, means for mounting rotary cutting equipment including a carriage movable on the tracks along the elongate track support, said carriage including a first wheel, first wheel mounting means for mounting the first wheel for rotary movement along one of the track surfaces, a second wheel, and second wheel mounting means for mounting the second wheel for rotary movement along the other of the track surfaces, said first wheel mounting means including an eccentric member for adjusting the first wheel selectively toward and away from the one track surface, and means on the carriage and on the track support beyond the periphery of the circular cross-section for propelling, and for selectively arresting, the carriage relative to the tracks.

From still another aspect thereof, the invention resides in apparatus for movably mounting and guiding rotary cutting equipment, comprising in combination an elongate track support having a circular cross-section, at least two distinct, mutually spaced elongate tracks extending along the track support and projecting from the track support beyond the periphery of the circular cross-section, means for mounting rotary cutting equipment including a carriage movable on the tracks along the elongate track support, means on the carriage and on the track support beyond the periphery of the circular cross-section for propelling, and for selectively arresting, the carriage relative to the tracks, said propelling and selective arresting means including a toothed rack extending along and located on the track support, and means on the carriage including a pinion meshable with the rack for selectively arresting and propelling the carriage, and means for mounting the elongate track support with the rack including a mounting device, comprising in combination a first mounting device part, a second mounting device part, means connected to the first and second mounting device parts for releasably retaining the first and second mounting device parts in an assembled condition, and for selectively releasing the first and second mounting device parts to an open condition for receiving a portion of the track support with the rack, said first and second mounting device parts being complementary and defining an opening for receiving a portion of the track support with the rack, and at least one of said first and second mounting device parts having a toothed portion at the opening for meshing with the toothed rack when the portion is in the opening.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figures 1, 6, 7, 8, 9:
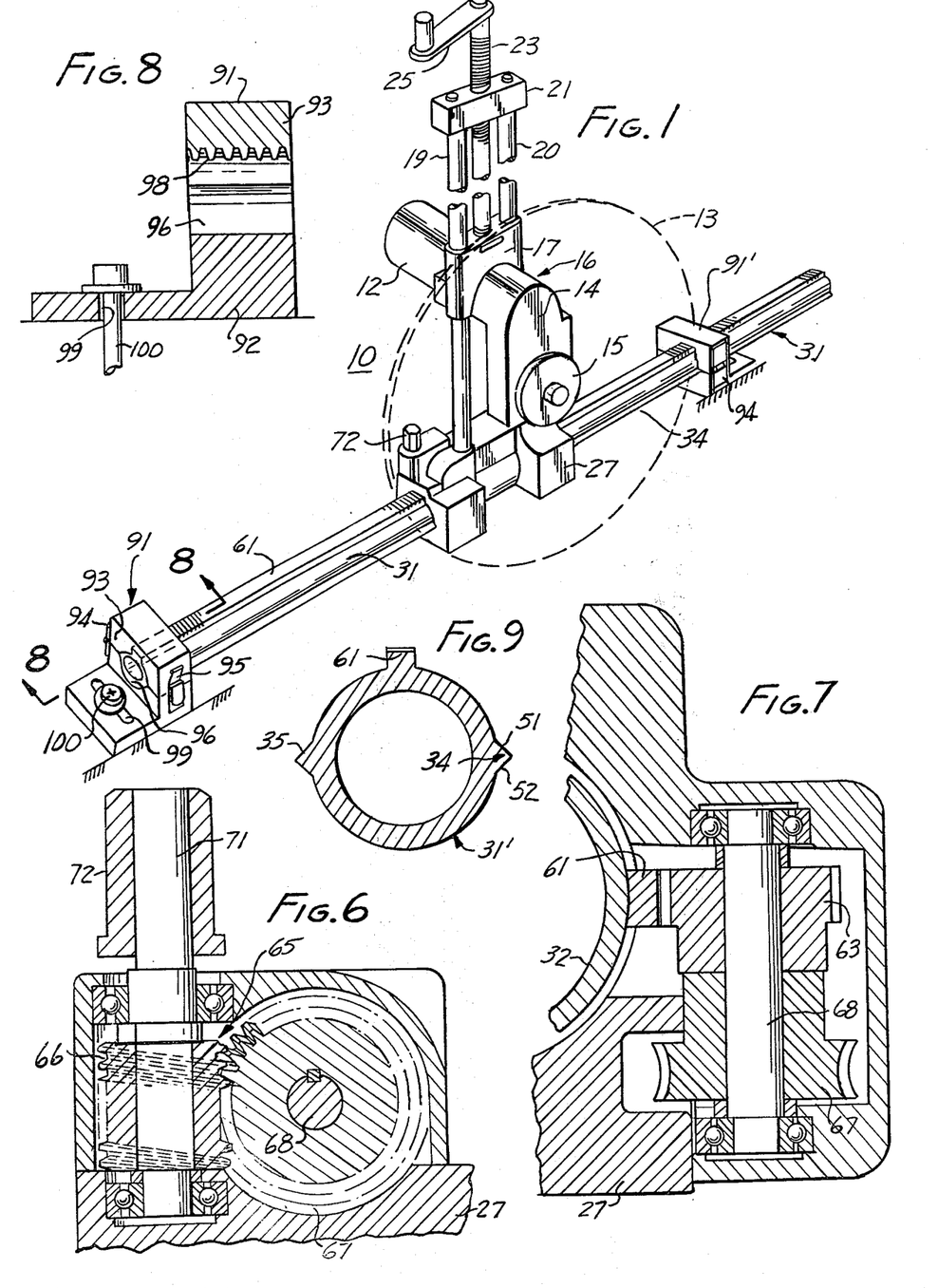
FIG. 1 is a perspective view of a concrete saw including apparatus for movably mounting and guiding rotary cutting equipment in accordance with a preferred embodiment of the subject invention.
FIG. 6 is a view on an enlarged scale taken along the line 6 — 6 in FIG. 2.
FIG. 7 is a view on an enlarged scale taken along the line 7 — 7 in FIG. 2 but turned clockwise 90%.
FIG. 8 is a section on an enlarged scale through a mounting device in accordance with a further preferred embodiment of the subject invention, taken along the line 8 — 8 in FIG. 1.
FIG. 9 is a cross-section through apparatus for movably mounting and guiding rotary cutting equipment in accordance with a further preferred embodiment of the invention.

The concrete cutting or sawing equipment 10 shown in FIG. 1 has an electric or hydraulic motor 12 for driving a circular saw blade 13, shown only in dotted outline, via gearing 14 and a saw blade hub 15. The motor 12 and gearing 14 are part of a drive assembly 16 which is attached to a truck 17 which is fitted to slide along a pair of spaced parallel rods 19 and 20.

A block 21 maintains the free ends of the rods 19 and 20 in spaced parallel relationship. A screw 23 extends through a threaded aperture in the block 21 and has a free end coupled to the truck 17 by a head portion 24, so as to move the truck 17 upwardly and downwardly along the rods 19 and 20 upon rotation of a handle 25 in opposite senses. In this manner, the rotating saw 13 may be moved into the concrete wall or floor to be cut and the depth of the cut may be adjusted. At the end of a cutting operation, the saw 13 may be removed from the cut by an appropriate movement of the truck 17 through rotation of the lead screw 23.

The rods 19 and 20 are firmly attached to a carriage 27 which is also part of the equipment for mounting the rotary cutting device or circular saw 13. The carriage 27 rides back and forth along a track structure 31. This track structure comprises an elongate track support 32 having a circular cross-section as is best apparent from FIGS. 4 and 5. The track structure 31 further includes at least two distinct, mutually spaced elongate tracks 34 and 35 which extend along the track support 32 and project from this track support beyond the periphery of its circular cross-section.

The carriage 27 is movable on the tracks 34 and 35 along the elongate track support 32. To this end, the carriage 27 has a plurality of wheels inside of wheel boxes 37, 38, 39 and 40.

Figure 2:
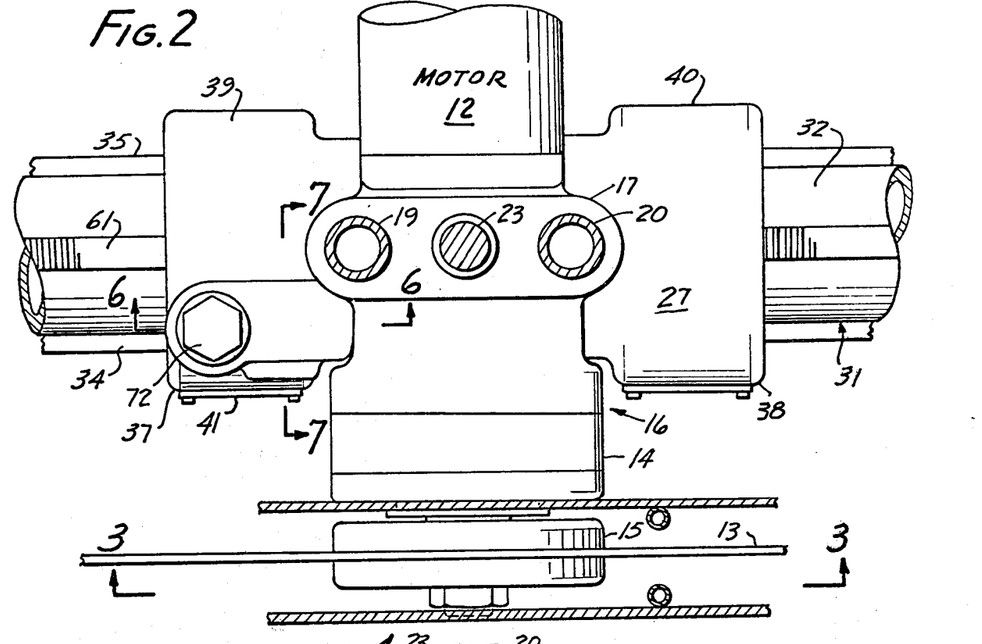
FIG. 2 is a fractional top view of the apparatus of FIG. 1, except that certain carriage propulsion parts have been reversed to illustrate an alternative embodiment.
Figure 3:
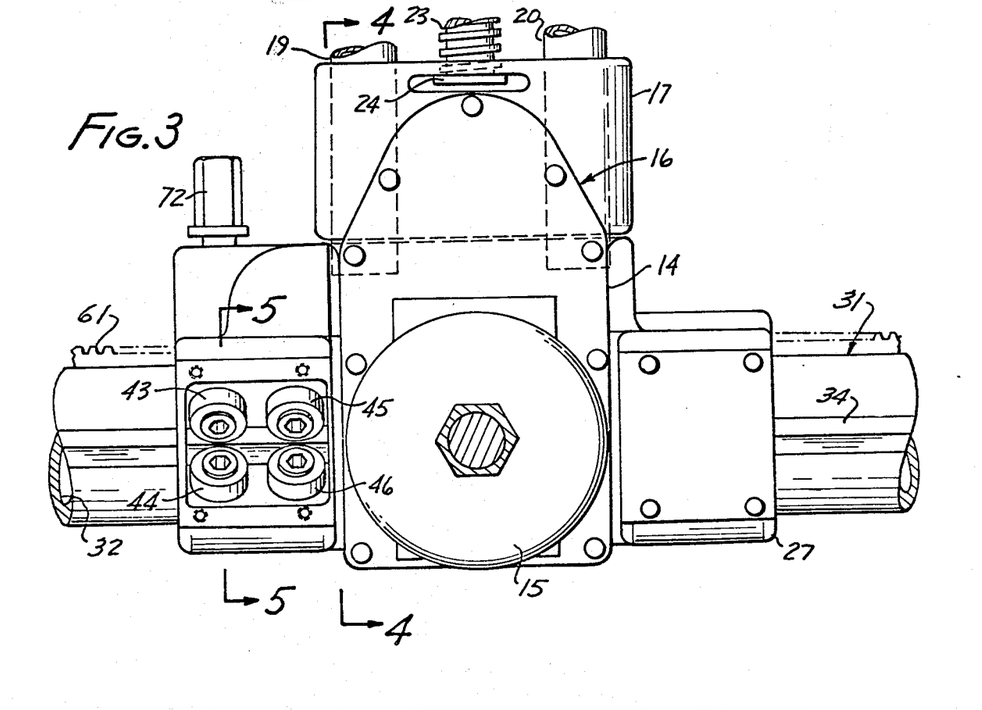
FIG. 3 is a view taken along line 3 — 3 of FIG. 2.

In FIG. 3, the wheel box cover 41 (see FIG. 2) has been removed to expose the wheels 43, 44, 45 and 46. A like number of wheels are contained in the wheel boxes 38, 39 and 40, and two of the wheels 48 and 49 in the wheel box 39 are visible in FIG. 5.

Figure 4:
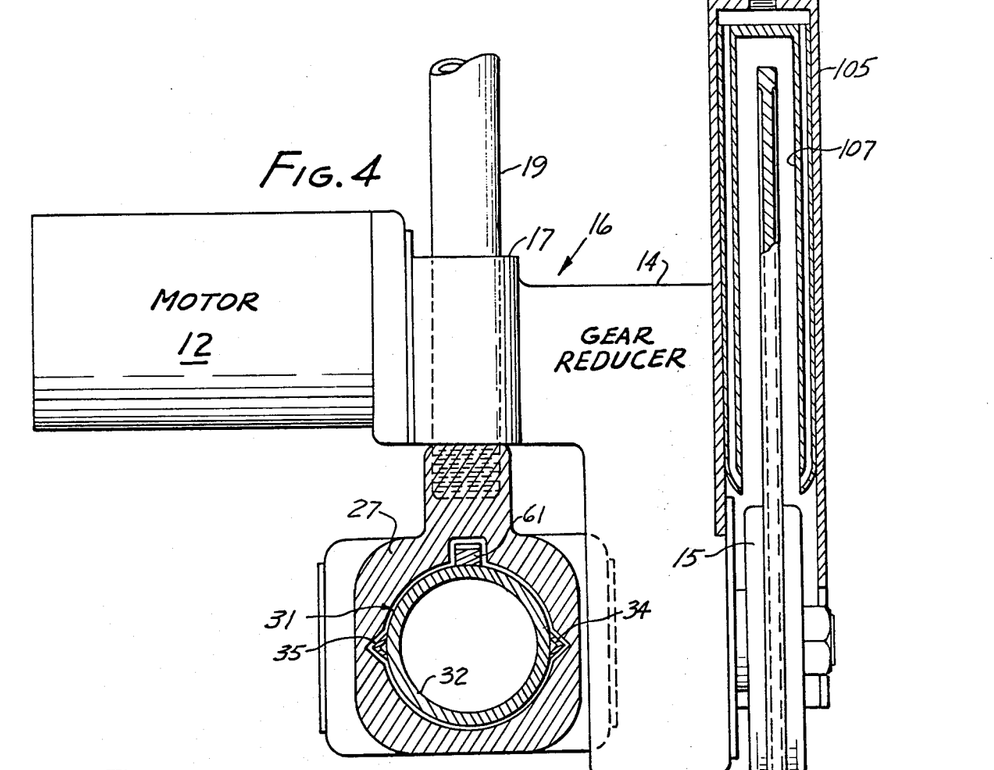
FIG. 4 is a view taken along the line 4 — 4 in FIG. 3.
Figure 5:
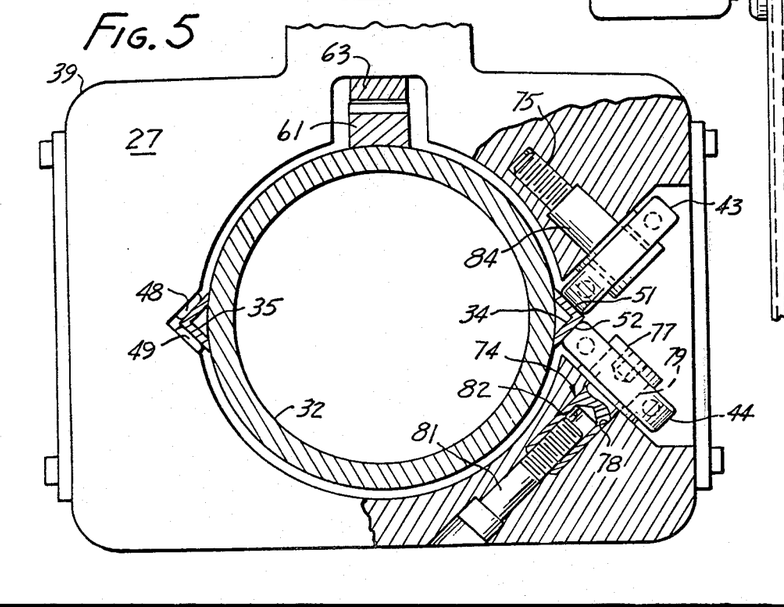
FIG. 5 is a view on an enlarged scale taken along the line 5 — 5 in FIG. 3.

Considering FIGS. 3 to 5, it will be recognized that no part of the carriage 27 rides on the track support 32. To the contrary, the carriage 27 with its wheels 43, 44, etc., rides only on the tracks 34 and 35 which are quite distinct from the track support 32 with its circular cross-section. In this manner, the maximum strength and structural integrity of the elongate track support 32 are preserved. This favorably distinguishes the mounting structures and concrete cutting equipment according to the subject invention from prior-art designs which used weaker rectangular or polygonal track structures or which impaired the strength and structural integrity of basically circular structures through cuts, notches or flattened track surface portions.

Moreover, since the tracks 34 and 35 themselves are distinct from the track support 32, the track support 32 is not subjected to any bearing surface action or wear or to abrasion by excessive friction or contaminants.

The areas of frictional engagement between the carriage wheels and the track structure 31 are advantageously limited to the distinct tracks 34 and 35.

In accordance with the illustrated preferred embodiment of the invention, any part of each of the tracks 34 and 35 is located outside the circular cross-section of the track support 32.

As is best seen in FIG. 5, the track 34 has a pair of track surfaces 51 and 52 inclined relative to, and located on opposite sides of, a radial plan through the track support 32 having the above mentioned circular cross-section. It will thus be recognized that the subject invention enables the use of a track configuration that resembles those provided by some guide rails with rectangular cross-section, while preserving at the same time the superior strength and structural integrity of an unimpaired circular cross-section. It should be understood at this juncture that the track support 32 may be hollow as well as solid. Thus, a solid cylindrical rod with a circular cross-section may be employed as the elongate track support 32. For the purpose of weight reduction and savings of materials, the illustrated preferred embodiments employ a tubular or hollow-cylindrical track support 32.

The track 35 may have the same configuration as the track 34. In the illustrated preferred embodiment, the tracks 34 and 35 project diametrically opposite from the linear track support 32.

However, other arrangements are conceivable within the scrope of the invention. For instance, three tracks, projecting from the cicular cross-section of the track support 32, may be employed on that track support. In this case, the three tracks are advantageously distributed at mutual angular displacements of 120° over the periphery of the track support 32.

In accordance with a futher preferred embodiment of the subject invention, each of the tracks 34 and 35 includes an angle iron having leg portions attached to the track support 32 and an apex portion projecting away from its circular cross-section. The leg portions of these angle irons may be attached to the track support 32 by welding. The hollow portions within the legs of the angle iron at 34 and 35 constitute a saving of material and contribute to the lower weight of the equipment.

The cutting equipment mounting and guiding apparatus according to the subject invention also include devices on the carriage 27 and on the track support 32 beyond the periphery of its circular cross-section for propelling, and for selectively arresting, the carriage 27 relative to the tracks 34 and 35. In the illustrated preferred embodiment, these devices include a toothed rack 61 extending along and located on the track support 32. These propelling and selective arresting devices also include equipment on the carriage 27, having a pinion 63 meshable with the rack 61 for selectively propelling and arresting the carriage 27.

As is best seen in FIG. 6, a worm gear 65 including a worm 66 and an associated gear wheel 67 constitute a self-arresting device which is coupled to the pinion 63 by a shaft 68 for arresting the carriage 27 in an achieved position along the track structure 31 as long as the worm 66 is not being driven.

The worm 66 is driven by rotation of a shaft 71 which has a polygonal head 72 for engagement by any tool (not shown) which has a socket corresponding in configuration to the head 72 and serving to rotate the shaft 71 for a propulsion of the carriage along the track structure 31 in either direction.

Rotation of the shaft 71 is translated by the worm 66 and gear wheel 67 into rotation of the shaft 68 and the pinion 63. Since the track structure 31 is relatively stationary, rotation of the pinion 63 results in movement of the carriage along the track 31 in either direction, depending on the sense of rotation imposed on the shaft 71 by the externally applied and actuated rotating tool. The shaft 71 with its polygonal head 72 may either be located nearer the circular saw 13, which is the position shown in FIG. 2, or distal from the circular saw 13, which is the alternative position shown in FIG. 1.

In accordance with the principles of the subject invention, any part of the toothed rack 61 is located on the track support 32 outside its circular cross-section. This ideally preserves the maximum strength and structural integrity of the track support 32 for a most precise and reliable performance.

This also favorably distinguishes the embodiments of the subject invention from those prior-art designs wherein track guides were severely weakened and exposed to excessive wear by a cutting of rack teeth into the guiding or supporting rail itself.

In the illustrated preferred embodiment, and in terms of FIG. 5, the carriage 27 includes a first wheel 44, and a first wheel mounting device 74 for mounting the first wheel 44 for rotary movement along the one track surface 52 of the track 34. Similarly, the carriage 27 has a second wheel 43, and a second wheel mounting device 75 for mounting the second wheel 43 for rotary movement along the other track surface 51.

In accordance with the illustrated preferred embodiment shown in FIG. 5, the wheel mounting device 74 has an Allen head device 77 in the form of a shoulder sleeve which is inserted into a hole 78 in the carriage 27. The device 77 has an eccentric shoulder or stepped member 79 for adjusting the first wheel 44 selectively toward and away from the track surface 52 when the device 77 is turned.

Other wheels corresponding to the wheels 44 on either side of the carriage 27 may be equipped with eccentric adjusting devices 79 for an adjustment of the carriage relative to the tracks and a smooth and precise operation of the equipment. The device 77 is arrested in any rotational position by a counterscrew 81 which threads into a threaded bore 82 in the device 77.

The mounting device 75 for the second wheel 43 and for corresponding other carriage wheels may simply be an Allen screw which has a sleeve 84 and which is threaded into a threaded bore in the carriage 27.

It will be noted that the carriage wheel mounting and adjustment structure herein disclosed is superior in terms of operation and accuracy to the structure disclosed, for instance, in the above mentioned U.S. Pat. No. 2,525,712.

A certain universality of the principles of the subject invention may be seen from the fact that the basic principles and their advantages remain intact, even if parts of the track structure 31 are manufactured in one piece through extrusion, machining or otherwise. For instance, as shown in FIG. 9, the track support 32 and the tracks 34 and 35 may be present in one piece to provide a modified track structure 31'. Here, the surface of the track support is of course not a complete circle, but rather, it is interrupted by built up portions defining the tracks and the toothed rack 61. Hence, in its broadest sense, the term "circular cross-section" is more accurately defined as a cylinder of revolution which includes at least some portions of the periphery of the track support. Even in that construction, any part of each of the tracks 34, 35 is located outside the circular cross-section of the track support part 32.

In accordance with a preferred embodiment shown in FIG. 9, the toothed rack 61 is also present in one piece with the track support 32 and the tracks 34 and 35. Again, any part of the rack 61 is located outside of the circular cross-section of the track support 32.

FIG. 8, with the aid of FIG. 1, illustrates a mounting device for an elongate toothed structure, which may, for example, be employed to mount the track structure 31 relative to a concrete floor, wall or other structure to be cut.

The mounting device 91 shown in FIGS. 1 and 8 comprises a first mounting device part 92, a second mounting device part 93 and devices, including first connection in the form of a hinge 94 and a releasable fastening devivce 95, connected to the first and second parts 92 and 93 for releasably retaining these parts in an assembled condition, shown in FIGS. 1 and 8, and for selectively releasing these first and second parts to an open condition in which the top part 93 has been swung about the hinge 94 relative to the base part 93 for a reception of the toothed track structure 31 in the mounting device 91.

The base and top parts 92 and 93 are complementary and define an opening 96 for receiving a portion of the track support 32 with the rack 61 or, in other words, of the toothed track structure 31.

It will be noted that the hinge 94 articulately interconnects the base 92 and the top 93 on one side of the mounting device, and that the releasable fastening device 95 releasably interconnects the base 92 and top 93 on the other side of the mounting device 91.

In accordance with a principle of the currently discussed aspect of the invention, at least one of the first and second mounting device parts 92 and 93 has a toothed portion at the opening 96 for meshing with the toothed rack 61 when the track support or track structure portion is in the opening 96, as shown in FIG. 1.

According to the illustrated preferred embodiment, the toothed portion 98 of the mounting device 91 is present in the top part 93. In this manner, the mounting device rigidly and reliably retains the track structure 31 in any desired position against lateral and longitudinal displacement, until the fastener 95 which may include a buckle or other suitable device, is opened for a removal of the top part 93 from the base part 92. In principle, the toothed mounting device portion 98 may be provided in the base part 92 or in both the base and top parts 92 and 93, depending on the position and orientation of the rack 61 on the track support 32.

The base part 92 of the mounting device 91 has a slot 99 which is preferably oriented in parallel to the rack teeth on the rack structure 61 to permit lateral adjustment of the mounting device 91. A screw 100 completes the means for attaching to the base 92 to a floor, wall or other structure to be cut.

The mounting device 91' shown in FIG. 1 corresponds to the mounting device 91 and may be identical thereto. The positioning of the mounting device 91' in FIG. 1 illustrates the fact that such positioning is not limited to any end portion of the track structure 31. Accordingly, the track structure may always be attached to a sound and solid structure even if in the structure to be cut there should be holes or other discontinuities at the locations of the track end portions. The mounting slot 99 in the base 92 complements the toothed portion 98 in the top 93, in that the toothed portion 98 permits longitudinal adjustment of the track structure 31, while the slot 99 permits lateral adjustment as mentioned above.

The disclosed apparatus may be enhanced or augmented by further equipment. For instance, the assembly 16 may be outfitted with a guard 105 which has a threaded aperture 106 for the reception of a fitting (not shown) which supplies water or another coolant from a hose (not shown) to a distributor 107 that applies the coolant to the saw blade 13.

Further preferred embodiments of the invention are shown in FIGS. 10 to 13.

Figure 10:
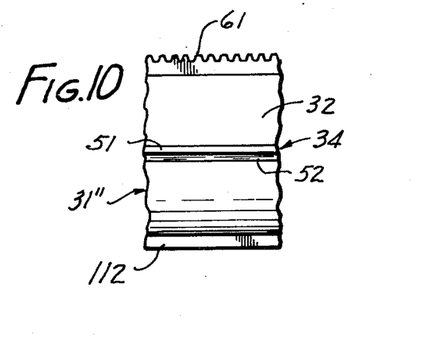
FIG. 10 is a fractional side view of apparatus for movably mounting and guiding rotary cutting equipment in accordance with yet another preferred embodiment of the invention.
Figure 11:
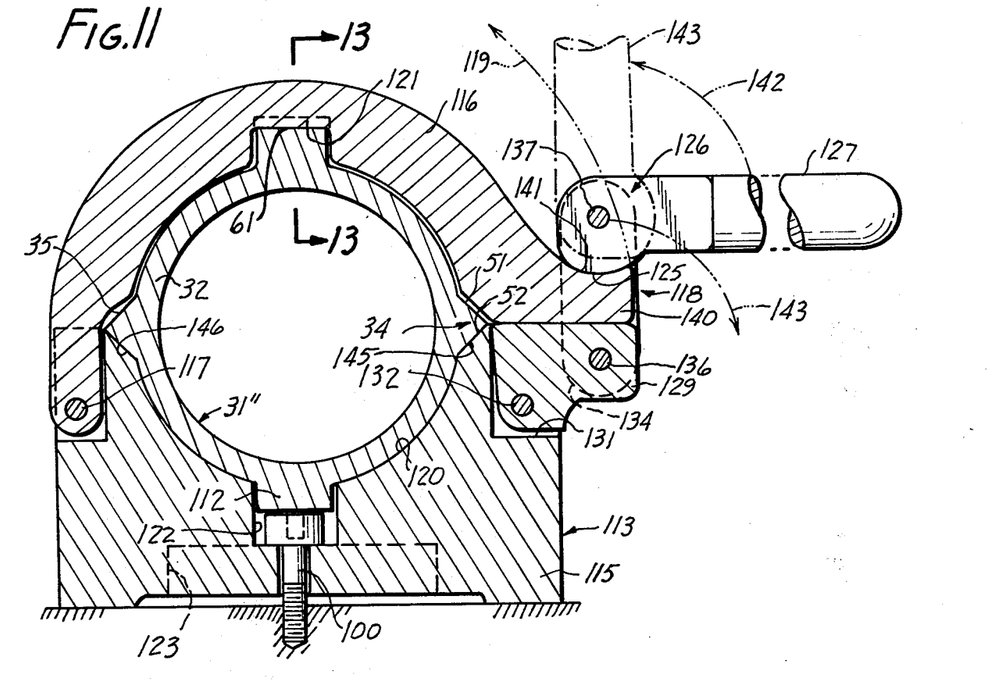
FIG. 11 is a cross-section through further apparatus for movably mounting and guiding rotary cutting equipment in accordance with a still further preferred embodiment of the subject invention as seen along the line 11 — 11 in FIG. 12.
Figure 12:
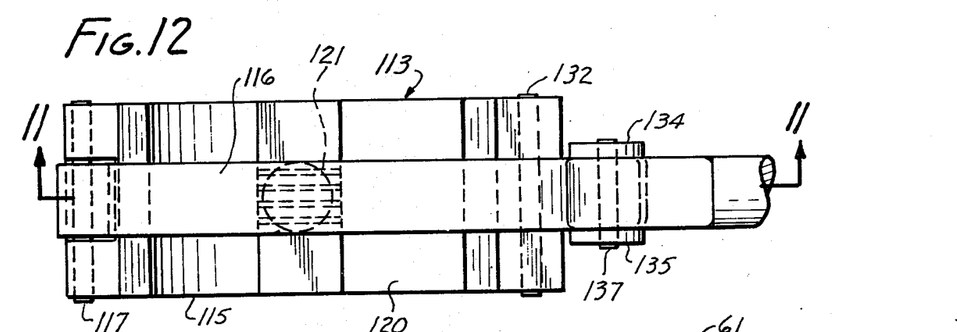
FIG. 12 is a top view of part of the apparatus of FIG. 11.
Figure 13:
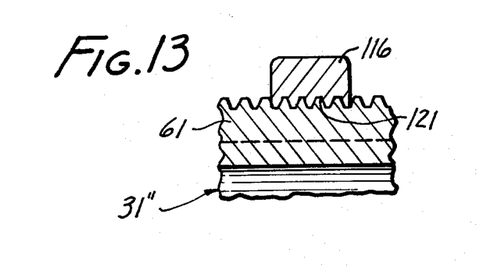
FIG. 13 is a section taken along the line 13 — 13 in FIG. 11.

In particular the mounting device shown in FIGS. 11 to 13 may be employed for mounting any of the track structures herein disclosed, such as the track structure 31, or the track structure 31' of FIG. 9, or the track structure 31" of FIG. 10.

The track structure 31" of FIG. 10 is similar to the track structure 31' of FIG. 9, except that it has an integral rib or rail 112 extending longitudinally along the track support 32 and projecting from this track support beyond the periphery of its circular cross-section, as also seen in FIG. 11. The remainder of the track structure 31" of FIGS. 10 and 11 may be identical to the track structure 31' of FIG. 9. The projecting elements 34, 35, 61 and 112 may be integral with the cylindrical track support 32 as shown. In the illustrated preferred embodiment, the rack extends along one side and the rail 112 along the other, opposite side of the track structure 31".

The mounting device 113 shown in FIGS. 11 and 13 comprises a first mounting device part 115, a second mounting device part 116 and devices, including a hinge 117 and a releasable fastening or retaining device 118, connected to the first and second parts 115 and 116 for releasably retaining these parts in an assembled condition, shown in FIGS. 11 and 12, and for selectively releasing these first and second parts to an open condition in which the top part 116 has been swung about the hinge 117 relative to the base part 115 as indicated by an arrow 119, for a reception of the toothed track structure 31, 31' or 31" in the mounting device 113.

The base and top parts 115 and 116 are complementary and define an opening 120 for receiving a portion of the track support with the rack 61 or, in other words, of the toothed track structure 31, 31' or 31".

It will be noted that the hinge 117 articulately interconnects the base 115 and the top 116 on one side of the mounting device, and that the releasable fastening device 118 releasably interconnects the base 115 and top 116 on the other side of the mounting device 113.

In accordance with a principle of the currently discussed aspect of the invention, at least one of the first and second mounting device parts 115 and 116 has a toothed portion at the opening 120 for meshing with the toothed rack 61 when the track support or track structure portion is in the opening 120, as shown in FIG. 11.

According to the illustrated preferred embodiment, the toothed portion 121 of the mounting device 113 is present in the top part 116. In this manner, the mounting device rigidly and reliably retains the track structure in any desired position against lateral and longitudinal displacement, until the fastener 118 is opened for a removal of the top part 116 from the base part 115. In principle, the toothed mounting device portion 121 may be provided in the base part 115 or in both the base and top parts 115 and 116, depending on the position and orientation of the rack 61 on the track support.

The base part 115 of the mounting device 113 has a slot 122 extending in parallel to a longitudinal axis through the essentially cylindrical opening 120. The slot 122 serves to receive the rail or rib 112 in order to retain the track support further against displacement and vibration. The mounting device 91 of FIGS. 1 and 8 may have a similar slot. In the illustrated preferred embodiment, the rack extends on one side and the rail 112 on the other side of the track support 32.

A screw 100 again constitutes a means for attaching to the base 115 to a floor, wall or other structure to be cut. A slot indicated only schematically at 123 in FIG. 11 may be cut into the base 115 to permit lateral adjustment of the mounting device 113. If the slot 123 is provided, than a corresponding slot (not shown) is also cut into the base 115 to accommodate the head of the screw 100.

The mounting device 113 may be positioned in the same manner relative to the track support as the mounting device 91 shown in FIG. 1. Accordingly, the track structure may always be attached to a sound and solid structure even if in the structure to be cut there should be holes or other discontinuities at different locations.

The releasable fastening or retaining device 118 includes a cam 125 forming part of an eccentric interlocking device 126 having also a manually engageable actuating handle or lever 127 integral with the cam 125.

An angular block 129 is partially located in a recess 131 of the base 115 and is pivotally mounted by a pin 132 on the base for limited angular movement relative to that base 115.

Two parallel straps 134 and 135 have part of the interlocking device 126, including the cam 125, extending therebetween. A pin 136 pivotally mounts corresponding first ends of the straps 134 and 135 on the block 129, and a pin 137 pivotally mounts the cam 125 or interlocking device 126 on corresponding second ends of the straps 134 and 135.

In this manner, the cam 125 or interlocking device 126 is mounted for rotary movement about an axis extending parallel to the elongate toothed structure retained in the mounting device 113. The cam or interlocking device, being thus mounted on one of the mounting device parts 115 and 116, such as the base 115, may be releasably coupled to the other of the first and second mounting device parts 115 and 116, such as to the top 116 as shown in FIGS. 11 and 12, by rotary movement with the aid of the lever 127 about the axis of the pivot pin 137.

In the illustrated preferred embodiment, the top has a projecting portion or nose 140 having a curved surface 141 for receiving the cam 125 in the solidly illustrated closed position of the interlocking device 126.

To open the mounting device 113 for a removal or replacement of the track structure, the interlocking device 126 with cam 125 and lever 127 is swung about the axis of the pin 137 in the direction of the arrow 142 from the solidly illustrated position to a position indicated by a dotted outline at 143. The interlocking device 126 and straps 134 and 135 may then be jointly swung about the axis of the pin 136 in the direction of the arrow 143 until the cam 125 has cleared the nose 140 for a removal of the top 116 from the base 115 in the direction of the arrow 119 about the hinge 117. The reverse process may be employed for closing the top 116 onto the base 115 after the track structure has been inserted, and for interlocking top and base for a secure retention of the track structure in the opening 120.

In all illustrated mounting device embodiments, at least the base has structure for supporting or retaining the lateral tracks 34 and 35. In particular, the base 115, as shown in FIGS. 11 and 12, has structure defining supporting surfaces 145 and 146 for the tracks 34 and 35. This further rigidifies the position of the mounted track structure.

It will thus be noted that the subject invention and its illustrated or otherwise disclosed preferred embodiments meet the initially stated objectives and provide other advantages as will become apparent during the practical use of the disclosed equipment.

Moreover, the subject extensive disclosure will suggest or render apparent various modifications or variations within the spirit and scope of the invention to those skilled in the art.

I claim:

1. Apparatus for movably mounting and guiding rotary cutting equipment, comprising in combination:
   an elongate track support having a circular cross-section;
   at least two distinct, mutually spaced elongate tracks extending along said track support and projecting from said track support outwardly beyond the periphery of said circular cross-section;
   mounting means for mounting rotary cutting equipment on said track support, said mounting means including a carriage to which the rotary cutting equipment is attached, said carriage having means for engaging the said tracks and exerting substantially all of its weight thereon, so that the remainder of the circular cross-section of the track support is substantially free from bearing the weight of the carriage; and
   means on said carriage and on said track support, located beyond the periphery of said circular cross-section, for propelling, and for selectively arresting, said carriage relative to said tracks.

2. Apparatus as claimed in claim 1, wherein:
   said propelling and selective arresting means include a toothed rack extending along and located on said track support; and
   means on said carriage including a pinion meshable with said rack for selectively propelling and arresting said carriage.

3. Apparatus as claimed in claim 1, wherein:
   each of said tracks comprises a pair of track surfaces converging from the outer periphery of the circular cross-section to an apex, and said carriage including bearing means engaging said track surfaces.

4. Apparatus as claimed in claim 3, wherein:
   said bearing means of the carriage comprises wheels which engage and roll along said track surfaces.

5. Apparatus as claimed in claim 1, wherein:
   said propelling and selective arresting means include a toothed rack extending along and located on said track support, with essentially all of said rack being located outside the outer periphery of said circular cross-section, and means on said carriage including a pinion meshable with said rack for selectively arresting and propelling said carriage.

6. Apparatus as claimed in claim 1, wherein:
   at least one of said tracks includes an angle iron having leg portions attached to said track support and an apex portion located outwardly from said circular cross-section.

7. Apparatus for movably mounting and guiding rotary cutting equipment, comprising in combination:
   an elongate track support having a circular cross-section;
   at least two distinct, mutually spaced elongate tracks extending along said track support and projecting from said track outwardly beyond the outer periphery of said circular cross-section, at least one of said tracks having a pair of track surfaces inclined relative to, and located on opposite sides of, a radial plane through said track support having said circular cross-section;
   means for mounting rotary cutting equipment including a carriage movable on said tracks along said elongate track support, said carriage including a first wheel, first wheel mounting means for mounting said first wheel for rotary movement along one of said track surfaces, a second wheel, and second wheel mounting means for mounting said second wheel for rotary movement along the other of said track surfaces, said first wheel mounting means including an eccentric member for adjusting said first wheel selectively toward and away from said one track surface; and
   means on said carriage and on said track support beyond the periphery of said circular cross-section for propelling, and for selectively arresting, said carriage relative to said tracks.

8. Apparatus as claimed in claim 1, wherein:
   said elongate track support and said tracks are present in one piece, with all parts of said tracks which cooperate with said carriage being located outside said circular cross-section.

9. Apparatus as claimed in claim 8, wherein:
   at least one of said tracks has a pair of track surfaces inclined relative to, and located on opposite sides of, a radial plane through said track support having said circular cross-section.

10. Apparatus as claimed in claim 1, wherein:
    said propelling and selective arresting means include a toothed rack extending along and located on said track support, and means on said carriage including a pinion meshable with said rack for selectively arresting and propelling said carriage; and
    said elongate track support, said tracks and said rack are present in one piece, with all parts of said tracks which cooperate with said carriage being located outside said circular cross-section, and all parts of the rack which engage the pinion also located outside said circular cross-section.

11. Apparatus for movably mounting and guiding rotary cutting equipment, comprising in combination:
    an elongate track support having a circular cross-section;
    at least two distinct, mutually spaced elongate tracks extending along said track support and projecting from said track support outwardly beyond the outer periphery of said circular cross-section;

means for mounting rotary cutting equipment including a carriage movable on said tracks along said elongate track support;

means on said carriage and on said track support beyond the outer periphery of said circular cross-section for propelling, and for selectively arresting, said carriage relative to said tracks, said propelling and selective arresting means including a toothed rack extending along and located on said track support, and means on said carriage including a pinion meshable with said rack for selectively arresting and propelling said carriage; and mounting means for mounting said elongate track support with said rack including a mounting device, comprising in combination:

a first mounting device part which comprises a base constructed to be fixedly attached to a supporting surface;

a second mounting device part which comprises a top operatively connected to the base structure at a first connection to pivot relative thereto;

retaining means connected to said base and top for releasably retaining them in an assembled condition, and for selectively releasing them to an open condition for receiving a portion of said track support with said rack;

said base and top being complementary and defining an opening for receiving a portion of said track support with said rack and said retaining means located across the track support from said first connection; and at least one of said base and top having a toothed portion at said opening for meshing with said toothed rack when said portion is in said opening.

12. Apparatus as claimed in claim 11, wherein:
said mounting means includes recesses for cooperating with and receiving said tracks.

13. Apparatus as claimed in claim 11, wherein:
said base includes means for attaching said base to a structure.

14. Apparatus as claimed in claim 11, wherein:
said first connection includes a hinge articulately interconnecting said base and said top.

15. Apparatus as claimed in claim 11, wherein:
said first connection includes a hinge articulately interconnecting said base and said top on one side of said track support, and a releasable fastener releasably interconnecting said base and said top on the other side of said track support.

16. Apparatus as claimed in claim 11, wherein:
said toothed mounting device portion is in said top.

17. A mounting device for an elongate toothed structure comprising in combination:

a first mounting device part which comprises a base constructed to be fixedly attached to a supporting surface;

a second mounting device part which comprises a top operatively connected to the base structure at a first connection to pivot relative thereto;

said base and top being complementary and defining an opening for receiving a cylindrical track support having a toothed structure;

at least one of said base and top having a toothed portion at said opening for meshing with said toothed structure portion when said portion is in said opening, and including a releasable retaining means located across the opening from the first connection for releasably clamping the base and top together, wherein when the base and top are separated the track support can be introduced into the space therebetween perpendicular to its own axis, after which the base and top can be closed thereon and clamped to hold the track support in place.

18. A device as claimed in claim 17, wherein:
said mounting device includes means for attaching said base to a structure.

19. A device as claimed in claim 17, wherein:
said first connection includes a hinge articulately interconnecting said base and said top.

20. A device as claimed in claim 17, wherein:
said first connection includes a hinge articulately interconnecting said base and said top on one side of said opening, and said releasable retaining means includes a releasable fastener releasably interconnecting said base and said top on the other side of said opening.

21. A device as claimed in claim 17, wherein:
said toothed mounting device portion is in said top.

22. A device as claimed in claim 17, wherein:
said retaining means include a cam, means for connecting said cam to one of said base and top, and means for releasably coupling said cam to the other of said base and top.

23. A device as claimed in claim 17, wherein:
said retaining means include a cam, means connected to said cam for mounting said cam for rotary movement about an axis extending parallel to said elongate toothed structure, and means for releasably coupling said cam by rotary movement about said axis to the other of said base and top.

24. A device as claimed in claim 17, wherein:
said retaining means include an eccentric interlocking device, means for connecting said eccentric interlocking device to one of said base and top, and means for releasably coupling said cam to the other of said base and top.

25. A device as claimed in claim 17, wherein:
said retaining means include an eccentric interlocking device, means connected to said eccentric interlocking device for mounting said eccentric interlocking device for rotary movement about an axis extending parallel to said elongate toothed structure, and means for releasably coupling said eccentric interlocking device by rotary movement about said axis to the other of said base and top.

26. A device as claimed in claim 17, wherein:
said retaining means include a cam, cam connecting means for connecting said cam to said base, and means for releasably coupling said cam to said top.

27. A device as claimed in claim 26, wherein:
said top has a curved surface for receiving said cam.

28. A device as claimed in claim 26, wherein:
said cam connecting means include means for mounting said cam for rotary movement about an axis extending parallel to said elongate toothed structure; and said coupling means include means for releasably coupling said cam to said top by rotary movement about said axis.

29. A device as claimed in claim 28, wherein:
said cam connecting mean further including a block, means for pivotally mounting said block for limited angular movement on said base, a strap having a first end pivotally mounted on said block and having a second end, and means for pivotally mounting said cam on said second end.

30. A device as claimed in claim 17, wherein:

said retaining eccentric connecting means include an eccentric interlocking device, means for connecting said eccentric interlocking device to said base, and means for releasably coupling said eccentric interlocking device to said top.

31. A device as claimed in claim 30, wherein said eccentric connecting means include means for mounting said eccentric interlocking device for rotary movement about an axis extending parallel to said elongate toothed structure; and said coupling means include means for releasably coupling said eccentric interlocking device to said top by rotary movement about said axis.

32. A device as claimed in claim 31, wherein:

said eccentric connecting means further including a block, means for pivotally mounting said block for limited angular movement on said base, a strap having a first end pivotally mounted on said block and having a second end, and means for pivotally mounting said eccentric interlocking device on said second end.

33. A device as claimed in claim 17, further including:

an elongate cylindrical track support having a toothed rack extending along one side thereof and a rail extending along another side thereof;

one of said base and top having a toothed first slot for receiving said rack; and the other of said base and top having a second slot for receiving said rail.

34. A device as claimed in claim 33, wherein:

said elongate toothed structure has tracks extending laterally therealong; and said base has structure for supporting said tracks.

* * * * *